Sept. 20, 1971 J. STRATHAUS 3,605,433
SALAD BOWL
Filed Nov. 10, 1969 2 Sheets-Sheet 2
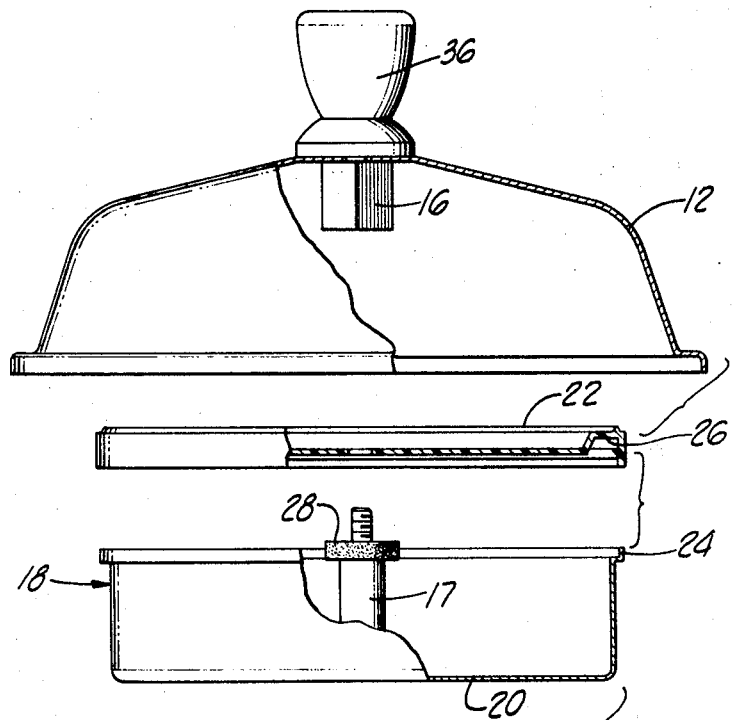
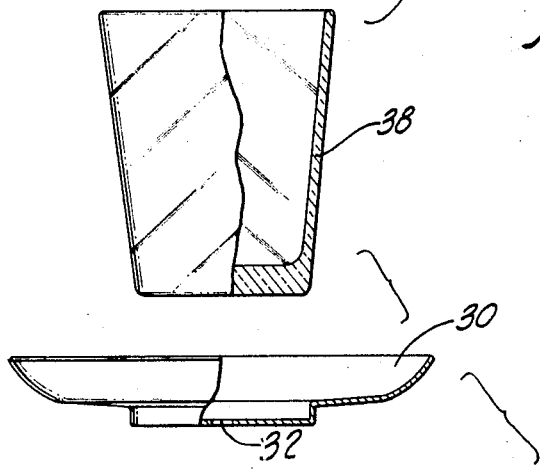
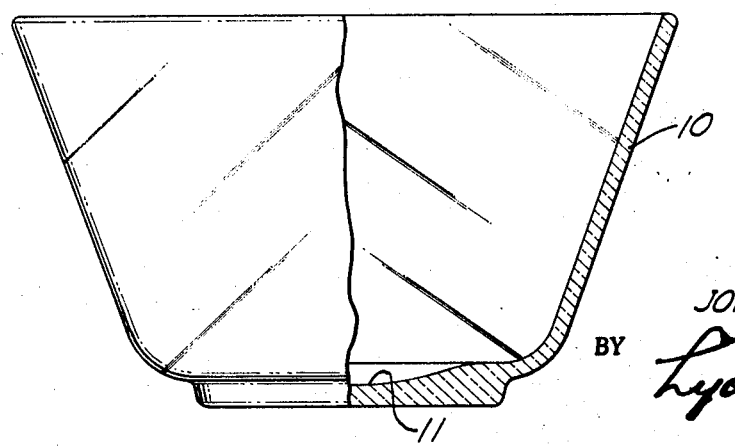
FIG. 6.
INVENTOR.
JOHN STRATHAUS
BY Lyon Lyon
ATTORNEYS – # United States Patent Office 3,605,433
Patented Sept. 20, 1971

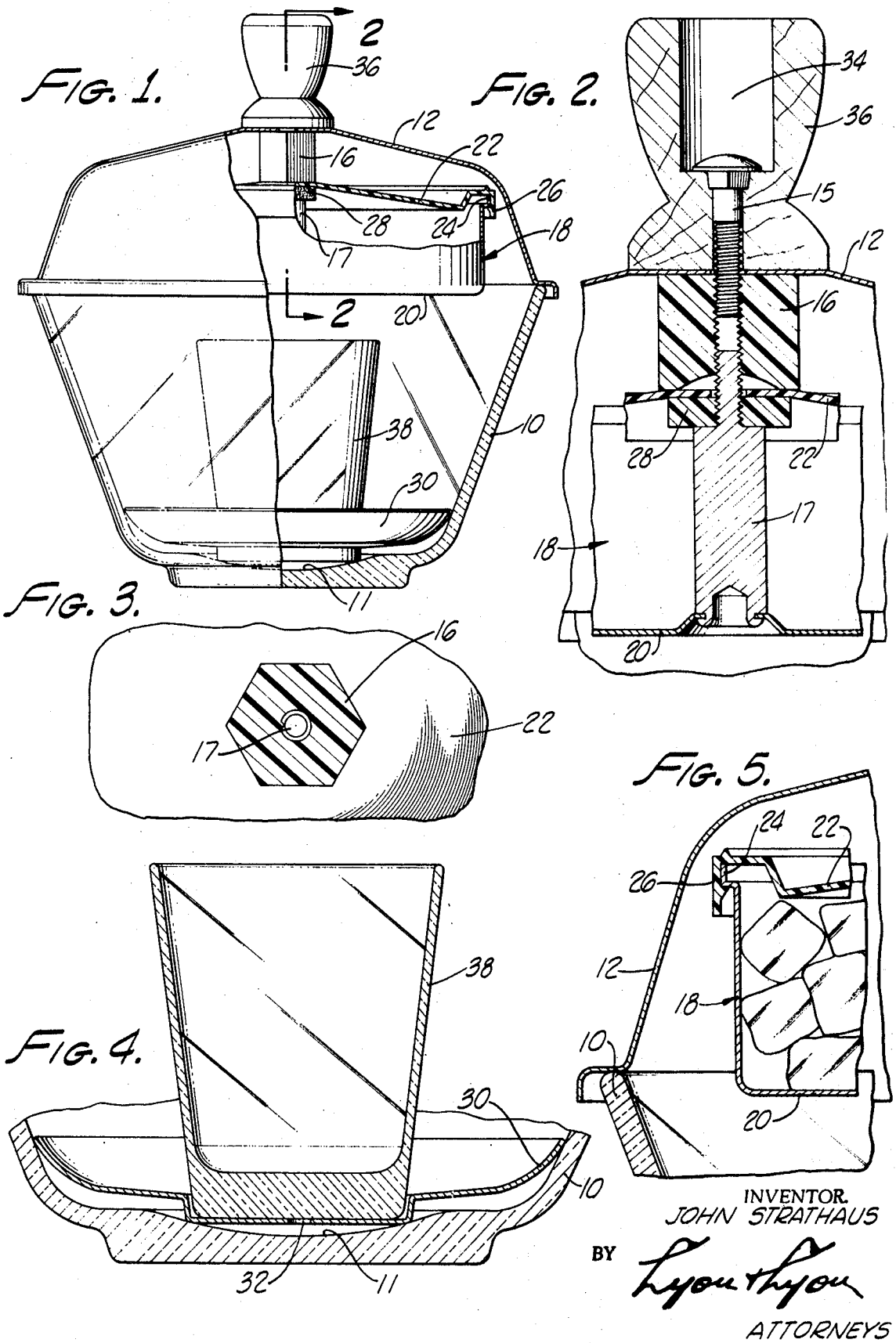

3,605,433
SALAD BOWL
John Strathaus, 11835 Highwater Road,
Granada Hills, Calif. 91344
Filed Nov. 10, 1969, Ser. No. 875,451
Int. Cl. F25d 3/08
U.S. Cl. 62—371      4 Claims

ABSTRACT OF THE DISCLOSURE

A salad bowl having a circular bottom bowl portion covered by a circular lid, the lid of the bowl having a refrigerant containing compartment detachably suspended from the lid of said bowl and thermally insulated therefrom to retain a cooler interior of said bowl and at the same time to prevent frosting of said bowl and lid as well as preventing the rapid loss of coolant media to the atmosphere.

BACKGROUND OF THE INVENTION

The present invention is an improvement in the art of salad bowls primarily for patio use where it is desirable to keep the salad material from wilting or spoiling as would be the case with shrimp cocktails on hot summer days or on long trips.

The particular improvement in the present invention resides in the use of a stud which thermally isolates the top cover from the refrigerant containing compartment to prevent heat transfer from the top lid to this compartment as well as to reduce the formation of condensate on this lid. This, as well as other features of the present invention, have not been illustrated in the prior art patents to Smith No. 24,636; Roberts No. 170,770; Morland No. 41,228; Chase No. 275,587; Pecar No. 293,074; Tressel No. 1,720,935; Du Bois No. 2,018,608; and Bolen No. 2,301,510.

The principal object of the present invention is to provide a container with a refrigerant container suspended from the top by a non-heat conductive material to reduce thermal transfer from the material to be cooled to the outside atmosphere.

A further object of the present invention is to provide an attractive salad bowl or cocktail container which is free from outside condensation.

A still further object of the present invention is to provide a refrigerant containing member with a flexible cover which will permit expansion of the refrigerant source during its freezing.

These and other objects and advantages will become apparent when the specification is viewed along with the accompanying drawings.

DESCRIPTION OF THE DRAWINGS

FIG. 1 is a cutaway side elevation of the salad bowl.

FIG. 2 is a cross sectional elevation of the top of the salad bowl and the refrigerant containing member.

FIG. 3 is an end cross sectional elevation of the thermal insulator and refrigerant containing member.

FIG. 4 is a partial cross sectional elevation of the bottom portion of the salad bowl.

FIG. 5 is a partial cross sectional elevation of the top portion of the salad bowl.

FIG. 6 is an exploded assembly of the salad bowl.

DESCRIPTION OF THE INVENTION

Referring now to the drawings, the present invention comprises basically a base bowl 10 and a cover lid 12 for the base bowl. At the top of the cover is a handle 36 which is attached to the cover 12 by a threaded member 15 through an internally threaded member of a non-thermal transmitting material 16. This non-thermal transmitting member may be comprised of Teflon or an equivalent material. An externally threaded member 16 is attached to the base 20 of the refrigerant compartment, generally designated as 18. Above the refrigerant compartment 18 is a top member 22 which is a tight fitting top interlocking the sides 24 of the base 20 by grooves 26.

This feature is provided so that the top 22 may expand if the user decides to fill the refrigerant compartment 18 with water and place the unit in a freezer and freeze the entire unit for usage.

An additional thermo transfer insulator 28 is placed between the top of the refrigerant container 22 and the non-thermal transmitting material 16 to provide for additional insulation between the top of the refrigerant container unit and the top 12 of the salad bowl.

In the present invention a saucer 30 may be placed in the bottom of bowl 10 along with cocktail container 38 which may be used to contain sauces or the like while shrimp or other sea food cocktails may be placed in the bottom of bowl 10. A drainage hole 32 is provided in the bottom of saucer 30 which provides a two-fold function. This hole allows for internally generated condensate drainage, either from the refrigerant as well as drainage from the washed salad as well as allowing the saucer 30 to be readily removed from the bottom of the bowl 10 as a means to overcome the surface tension created by condensates between the saucer 30 and the bottom 11 of the bowl 10.

A handle 36 is provided above the bowl lid 12 for removing and replacing the lid and may be hollowed out as illustrated by numeral 34 to make an access for toothpicks or the like.

Various changes and modifications may be made in carrying out the present invention without departing from the scope and spirit thereof. Insofar as these changes and modifications are within the purview of the appended claims, they are to be considered as part of the invention.

I claim:

1. A salad bowl with a base member and a lid member of covered said base member, the improvement comprising a refrigerant containing bowl detachably suspended from said lid member and spaced away from said lid member from a non-heat conductive member;

said member insulating said refrigerant containing bowl from said lid member to prevent transfer of the atmospheric heat from outside said lid member to said refrigerant containing bowl and to prevent condensation from the atmosphere from forming on said lid member;

said refrigerant containing bowl comprising a flexible lid member and a base member;

said flexible lid member providing means to allow for expansion when said base member is filled with water and frozen with said lid member covering said base member.

2. The combination of claim 1 wherein said refrigerant containing bowl comprises a lid member and a base member, said lid member covering said base member in a tight fitting overlapping relationship.

3. The combination of claim 1 wherein said refrigerant containing bowl comprises a lid member and a base member, and said non-heat conductive member threadably engages said refrigerant containing bowl at said base member.

4. The combination of claim 1 wherein a saucer is placed in said base bowl member to contain salad cocktail ingredients, and a cocktail sauce container is supported on said saucer.

References Cited

UNITED STATES PATENTS

| | | | |
|---|---|---|---|
| 275,587 | 4/1883 | Chase | 62—371 |
| 1,720,935 | 7/1929 | Tressel | 62—371 |

WILLIAM J. WYE, Primary Examiner

U.S. Cl. X.R.

62—298, 384, 457, 459, 464; 312—236